March 29, 1927.
F. A. CALKINS
1,622,627
CHAIN LINK OPENING AND CLOSING DEVICE
Filed March 9, 1925
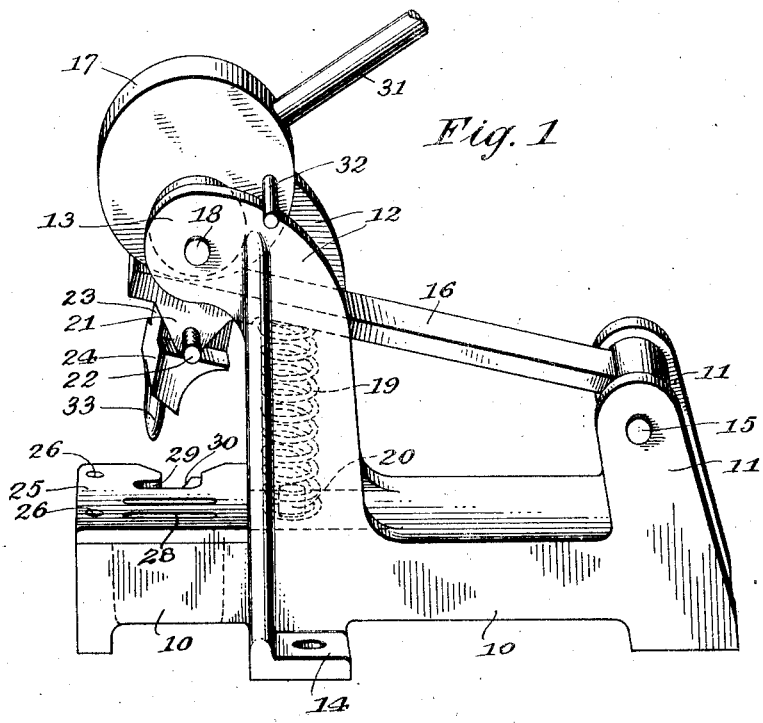
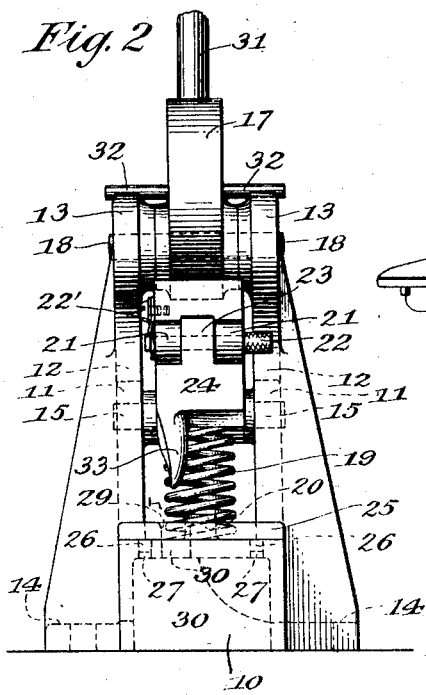
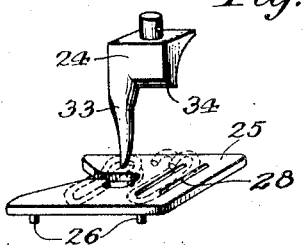
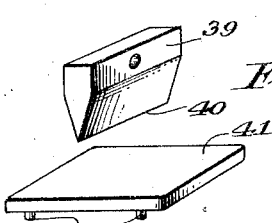
INVENTOR.
Frederick A. Calkins
BY Chamberlain & Newman
ATTORNEYS.

Patented Mar. 29, 1927.

1,622,627

UNITED STATES PATENT OFFICE.

FREDERICK A. CALKINS, OF WATERBURY, CONNECTICUT.

CHAIN-LINK OPENING AND CLOSING DEVICE.

Application filed March 9, 1925. Serial No. 14,066.

This invention relates to new and useful improvements in tools and more particularly to one designed for almost general use in automobile repair shops, either public or private.

The primary object of the invention is to provide such a means which may be readily attached to a work bench or other convenient support (or if so desired may be carried about in a tool box) and which is designed to receive various tools, such as a non-skid chain link opening and closing tool or a brake lining cutting tool, used in vehicle repair work.

A further object is to provide a device for the purpose specified, which will with the minimum of labor on the part of the operator deliver sufficient power to insure the easy performance of the work being done.

An additional object is to provide a device of the character stated in which the different tools and their respective cooperative die plates may be easily and quickly changed.

With these and other objects in view as will become more readily apparent as the description proceeds, the invention consists in certain novel features of construction, combination and arrangement of parts as will be hereinafter more fully described, illustrated and claimed.

Referring to the accompanying drawings wherein for the purpose of illustration I have shown a satisfactory embodiment of my invention:—

Fig. 1 is a perspective view of the device, the same being tilted toward the point of observation;

Fig. 2 is a front view of same;

Fig. 3 is a perspective view of the form of tool, and its cooperating die plate, shown in Figs. 1 and 2, but illustrating a different form of shank;

Fig. 4 is a similar view of a different tool and its die plate; and

Fig. 5 is a perspective view of another form of tool and die plate.

Having detailed reference to the drawing, the device or machine includes a base 10 having a pair of spaced uprights 11 adjacent its rear end. Also formed with the base 10, intermediate the ends thereof, but forwardly of the center thereof are a second pair of spaced uprights 12. The uprights 12 are of greater height than the uprights 11 and have their upper ends carried forward to provide spaced ears 13.

Base 10 and uprights 11 and 12 are preferably cast integral to form a strong rigid frame. This frame may, if desired, be secured to a work bench or other suitable support by passing bolts or screws through openings in the feet 14.

Pivotally mounted at its rear end between the upper ends of the uprights 11, by means of a pin 15, is a leaf or tool carrier 16. This tool carrier operates between the uprights 12 and has its forward end portion disposed slightly in advance of the ears 13.

A cam disc 17 is eccentrically mounted between the ears 13, by means of a pin 18. The tool holder 16 is yieldingly held in contact with this disc or cam by means of a coil spring 19 which at one end receives a lug or projection 20 on the base 10 and at its other end receives a similar lug on the tool holder. These lugs hold the spring against casual displacement.

At its forward end and on its under side the tool holder 16 carries a pair of spaced downwardly projecting perforated lugs 21 adapted to form a socket to receive therein and have secured by means of a pin 22, a similarly perforated shank portion 23 of a tool 24. Spring clip 22' prevents accidental displacement of the pin.

Detachably mounted on the upper side of the forward end of the base portion 10 is a die plate 25. This die plate is provided at its underside (Figs. 2 and 3) with a pair of aligning pins 26 adapted to fit into openings 27 in base 10. In this manner the plate is properly secured in position beneath the tools carried by the holder 16. On its upper side the plate is provided with a pair of spaced parallel grooves 28 to receive the side bars of a link as suggesed in the drawing. Also, the die plate is provided with an opening 29 which when the plate is in operative position registers with a similar opening 30 in the base to allow the tool to freely pass through the chain link.

The cam 17 is mounted above the die plate 25 and has an opening to detachably receive an operating handle 31. The position of the cam is such that when it is rotated by means of the handle 31, the tool carrier will be depressed, and pressure will be delivered to a tool, carried thereby, in an almost vertical line. This relative arrangement of parts, so that the power is delivered in a substantially straight line, provides for the delivery of the maximum power at the tool.

As the handle 31 is comparatively heavy, and as its normal position is that disclosed in Fig. 1 it would tend to depress the tool carrier 16 and consequently compress the spring 19, if some check were not provided. To avoid the action mentioned, a pin 32 is passed through the cam 17 adjacent the periphery thereof and in a position to engage the uprights and maintain the cam in the position shown. In this way the cam is held so that the handle 31 is in a position to be readily grasped and in addition the spring 19 is not subject to excessive pressure except when the machine is being used.

While the machine is adapted to receive a number of different tools for different purposes, it is primarily, as stated, designed for use in automobile repair shops. In the drawing, in Figs. 1, 2, 3 and 4 I have illustrated tools to be used in the opening and closing of chain links. To this end, the tool 24 includes the attaching shank portion 23 and the link opening point 33. This point is designed to enter the eyes of the link and open it, as suggested in Fig. 3, when the tool is depressed on proper rotation of the cam 17.

When it is desired to close a link the same is positioned with its side bars in the parallel grooves 28 (Fig. 3) in die plate 25. The cam is then rotated to depress the tool and bring the jaw 34 down into contact with the link, the point 33 passing through the openings 29 and 30 in the die plate and base respectively. Owing to the power of the machine, links may be readily opened and closed in the manner just described.

In Fig. 3 I have shown as a modified means of attaching the tool, a round shank on the tool adapted to enter the round hole in the carrier 16. A link opening tool without any closing feature, and the proper die plate to cooperate therewith, is disclosed in Fig. 4. This tool includes a perforated shank portion 35 and a link opening point or spike 36. Die plate 37 for cooperation with this tool, includes the pins 26 of die plate 25 and in addition is provided with a transverse opening 38.

When this tool is in the machine and the cam rotated, the tool will be depressed against the action of spring 19 to cause the point 36 to engage and expand the eye of a chain link which has previously been positioned as shown in Fig. 4. It will be understood that the point 36 passes into the openings 38 and 30 in the die plate and base respectively.

In Fig. 5 I have shown a cutting tool and die plate for cooperating therewith. This tool includes a perforated attaching shank portion 39 to be secured to the carrier 16 by means of the pin 22. Also the tool has a cutting edge 40. The die plate 41 for cooperation with this tool has the securing aligning pins 26 and is adapted to cover the forwardly extended portion of the base and form a support for material to be cut by the cutting tool. This cutting tool while primarily designed for cutting brake band linings into proper lengths may be used for cutting chains or other materials.

While the frame of the machine as above described is preferably cast the different tools and their cooperating die plates are of steel. These parts are of course subjected to the greatest wear and by making them of steel the long life of the machine is insured.

While I have shown and described in detail, a satisfactory embodiment of the invention, it is to be distinctly understood that the invention is not limited to the disclosure, as many changes in the details of construction will readily suggest themselves to those skilled in the art. For example, other means for securing the tools to the tool carrier or for securing the die plate to the base will be readily apparent. Therefore, for a definition of the limitations of the invention reference must be had to the appended claim.

Having thus described my invention what I claim and desire to secure by Letters Patent is:

In a machine of the class described, a frame including a base, a pair of uprights formed with the base and arranged as opposite sides thereof, a second pair of spaced uprights formed on the base in advance of the first pair of uprights, said base having a work supporting portion at its forward end, a pair of forwardly projecting ears formed on the second named pair of uprights and extending at opposite sides of the work supporting portion, a tool holder pivoted to the first named pair of uprights and arranged between the uprights of said pairs and having a tool receiving portion at its forward end, a spring engaging the tool holder at a point between the forward pair of spaced uprights for normally maintaining the tool holder elevated, and means supported by said forwardly projecting ears and contacting with the tool holder in advance of the point of contact between the tool holder and spring for depressing the tool by exerting pressure on the holder in vertical alignment with the tool and work supporting portion.

Signed at Bridgeport in the county of Fairfield and State of Connecticut this 6th day of March, A. D. 1925.

FREDERICK A. CALKINS.